United States Patent
Lee et al.

(10) Patent No.: US 8,721,888 B2
(45) Date of Patent: May 13, 2014

(54) WASTEWATER TREATMENT METHOD USING ANNULARLY ARRANGED MICROORGANISM CARRIERS

(75) Inventors: Der-Ming Lee, Taipei (TW); Ming-Kuei Chiang, Taipei (TW); Chin-Te Chen, Taipei (TW); Keng-Chuan Sung, Taipei (TW); Jih-Gaw Lin, Hsinchu (TW); Sin-Han Su, Kaohsiung (TW)

(73) Assignees: Leaderman & Associates Co., Ltd., Taipei (TW); National Chiao Tung University, Hsinchu (TW)

( * ) Notice: Subject to any disclaimer, the term of this patent is extended or adjusted under 35 U.S.C. 154(b) by 349 days.

(21) Appl. No.: 13/223,416

(22) Filed: Sep. 1, 2011

(65) Prior Publication Data

US 2013/0056411 A1    Mar. 7, 2013

(51) Int. Cl.
*C02F 3/30*    (2006.01)
*C02F 3/06*    (2006.01)
*C02F 3/10*    (2006.01)
*C02F 3/12*    (2006.01)
*C02F 101/16*    (2006.01)

(52) U.S. Cl.
CPC . *C02F 3/301* (2013.01); *C02F 3/06* (2013.01); *C02F 3/302* (2013.01); *C02F 3/101* (2013.01); *C02F 3/109* (2013.01); *C02F 3/1263* (2013.01); *C02F 2101/16* (2013.01); *C02F 2203/006* (2013.01); *Y10S 210/903* (2013.01)
USPC ........... 210/605; 210/617; 210/629; 210/150; 210/903

(58) Field of Classification Search
USPC ........ 210/605, 615, 617, 618, 629, 630, 150, 210/151, 194, 195.3, 903
See application file for complete search history.

(56) References Cited

U.S. PATENT DOCUMENTS

| | | | |
|---|---|---|---|
| 3,882,027 A * | 5/1975 | Lunt | 210/150 |
| 3,966,599 A * | 6/1976 | Burkhead | 210/151 |
| 4,454,038 A * | 6/1984 | Shimodaira et al. | 210/150 |
| 4,655,925 A * | 4/1987 | Tabata et al. | 210/605 |
| 4,663,044 A * | 5/1987 | Goronszy | 210/903 |
| 4,940,540 A * | 7/1990 | McDowell | 210/150 |
| 5,688,400 A * | 11/1997 | Baxter, Sr. | 210/195.3 |
| 5,690,819 A * | 11/1997 | Chianh | 210/150 |
| 7,645,385 B2 * | 1/2010 | Martin et al. | 210/630 |
| 7,972,513 B2 * | 7/2011 | Lee et al. | 210/630 |
| 2008/0245730 A1 | 10/2008 | Tokutomi | |
| 2010/0219125 A1 | 9/2010 | Northrop et al. | |

FOREIGN PATENT DOCUMENTS

JP    2004097974    4/2004

* cited by examiner

*Primary Examiner* — Christopher Upton
(74) *Attorney, Agent, or Firm* — Bacon & Thomas, PLLC

(57) ABSTRACT

A wastewater treatment method using annularly arranged microorganism carriers in a reaction tank, which defines therein an upper reaction area, a lower reaction area and a passage area surrounded by the microorganism carriers and kept in communication between the upper reaction area and the lower reaction area. Microorganisms including nitrifying bacteria and autotrophic denitrifying bacteria are attached to the surface of each microorganisms carriers and suspending in the water of the reaction tank for causing Anammox reaction to convert $NH_4^+$ and $NO_2^-$ in wastewater into nitrogen gas, achieving removal of total nitrogen compounds from water. The microorganism carriers are used to retain microorganisms in the reaction tank, enhancing the treatment efficiency.

9 Claims, 4 Drawing Sheets

US 8,721,888 B2

WASTEWATER TREATMENT METHOD USING ANNULARLY ARRANGED MICROORGANISM CARRIERS

BACKGROUND OF THE INVENTION

1. Field of the Invention

The present invention relates to wastewater treatment technology and more particularly, to an Anammox wastewater treatment method using microorganism carriers for growing microorganisms for wastewater treatment.

2. Description of the Related Art

Anammox (Anaerobic Ammonium Oxidation) is a globally important microbial process of the nitrogen cycle for wastewater treatment. US 2008/0245730 discloses a process and apparatus for treating an aqueous nitrogeneous liquor by performing ammonia oxidation and denitrification using a biosludge comprising anammox bacteria and ammonia-oxidizing bacteria. In the anammox process, $NH_4^+$ works as electron donor and $NO_2^-$ works as electron acceptor to generate nitrogen gas. The nitrogeneous components, in particular, ammonium nitrogen, are therefore removed. Further, when $NH_4^+$ in water is excessively high and $NO_2^-$ is insufficient, a part of $NH_4^+$ is oxidized into $NO_2^-$ in advance before the reaction.

However, the growing speed of autotrophic denitrifying bacteria according to the aforesaid prior art design is slow. Further, the autotrophic denitrifying bacteria may be carried out of the reaction tank with the flowing water. Thus, the population count of the autotrophic denitrifying bacteria may be insufficient, resulting in low treatment efficiency.

SUMMARY OF THE INVENTION

The present invention has been accomplished under the circumstances in view. It is the main object of the present invention to provide a wastewater treatment method, which uses microorganism carriers to retain microorganisms in a reaction tank, enhancing performance of Anammox reaction.

To achieve this and other objects of the present invention, a wastewater treatment equipment comprises a reaction tank holding water therein, a plurality of microorganism carriers annularly arranged in the reaction tank, and a stirrer arranged in the bottom side inside the reaction tank. The reaction tank defines therein an upper reaction area above the microorganism carriers, a lower reaction area below the microorganism carriers, and a passage area surrounded by the microorganism carriers and kept in communication between the upper reaction area and the lower reaction area. The passage area has a width smaller than the width of the upper reaction area and the width of the lower reaction area. Multiple microorganisms including nitrifying bacteria and autotrophic denitrifying bacteria are attached to the surface of each microorganism carrier and suspending in the water in the reaction tank.

Further, the width of the passage area reduces gradually in direction toward the upper reaction area. Further, the stirrer is disposed in the lower reaction area of said reaction tank. Further, the microorganism carriers are arranged along the inside wall of the reaction tank. Further, each microorganism carrier comprises a plurality of grooves on the periphery thereof. Further, disk aerators may be arranged in the bottom side inside the reaction tank.

To achieve this and other objects of the present invention, a wastewater treatment method comprises the steps of: a) providing a reaction tank, a plurality of microorganism carriers and a stirrer, which the reaction tank defining therein an upper reaction area in a top side, a lower reaction area in a bottom side and a passage area in communication between the upper reaction area and the lower reaction area, the passage area having a width smaller than the width of the upper reaction area and the width of the lower reaction area, the microorganism carriers arranged in the reaction tank around the passage area, the stirrer arranged in the reaction tank, the passage area and the lower reaction area of the reaction tank filled with water containing microorganisms including nitrifying bacteria and autotrophic denitrifying bacteria, the microorganism carriers dipped in the water; b) guiding wastewater into the reaction tank to have the upper reaction area be filled up with the wastewater; c) operating the stirrer to stir up the water in the reaction tank and to cause the water to circulate in the reaction tank; d) stopping the stirrer to let suspended solids settle down in the water in the reaction tank; and e) exhausting the water of the upper reaction area out of the reaction tank.

Further, the width of the passage area reduces gradually in direction toward the upper reaction area. Further, oxygen may be guided into the water in the reaction tank during step c).

Other advantages and features of the present invention will be fully understood by reference to the following specification in conjunction with the accompanying drawings, in which like reference signs denote like components of structure.

DETAILED DESCRIPTION OF THE INVENTION

Figure 1:
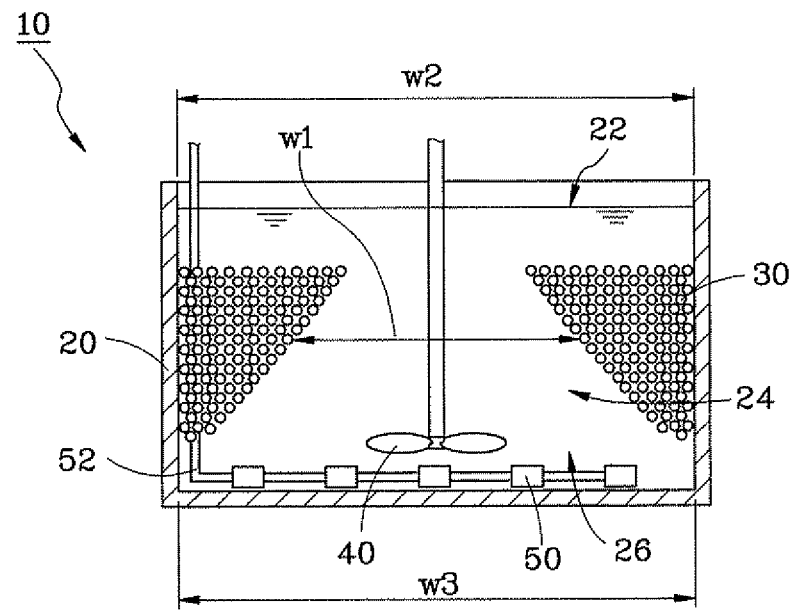
FIG. 1 is a schematic sectional side view of wastewater treatment equipment in accordance with a first embodiment of the present invention (I).

Referring to FIG. 1, a wastewater treatment equipment 10 in accordance with a first embodiment of the present invention is a sequencing batch reactor (SBR), comprising a reaction tank 20, a plurality of microorganism carriers 30, a stirrer 40 and a plurality of disk aerators 50.

Figure 2:
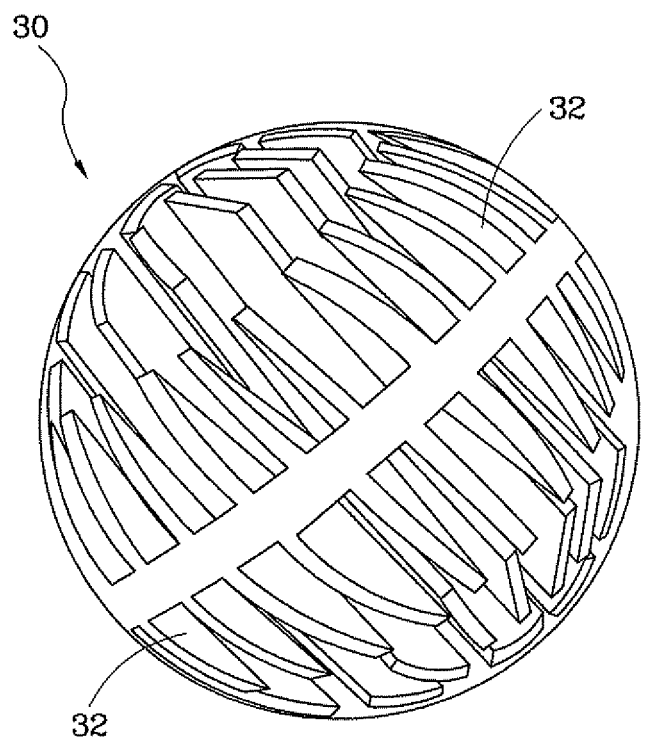
FIG. 2 is a front elevation of a microorganism carrier used in the wastewater treatment equipment in accordance with the first embodiment of the present invention.

The reaction tank 20 is filled up with water. The microorganism carriers 30 are spherical members having multiple grooves 32 on the periphery (see FIG. 2). These microorganism carriers 30 are annularly arranged in the water inside the reaction tank 20 along the inside wall of the reaction tank 20. The stirrer 40 is arranged near the bottom side inside the reaction tank 20. The disk aerators 50 are arranged in the bottom side inside the reaction tank 20 and connected to an air supply pipeline 52 for guiding oxygen or air into the water in the reaction tank 20. The reaction tank 20 defines therein an upper reaction area 22, a passage area 24 and a lower reaction area 26. The upper reaction area 22 is disposed above the microorganism carriers 30. The lower reaction area 26 is disposed below the microorganism carriers 30. The passage area 24 is surrounded by the microorganism carriers 30 and kept in communication between the upper reaction area 22 and the lower reaction area 26. The passage area 24 has a width W1 gradually reducing in direction toward the upper reaction area 22. The width W1 of the passage area 24 is smaller than the width W2 of the upper reaction area 22 and the width W3 of the lower reaction area 26. The stirrer 40 is disposed in the lower reaction area 26.

Further, the reaction tank 20 contains therein environmental microorganisms for treating wastewater containing nitrogen compounds. These environmental microorganisms are attached to the surfaces of the microorganism carriers 30 and suspending in the water in the reaction tank 20. These environmental microorganisms include at least nitrifying bacteria and autotrophic denitrifying bacteria.

During installation, the microorganism carriers 30 can be connected in series with iron wires or wrapped with a net-like wrapping material, holding the microorganism carriers 30 in place.

Figure 3:
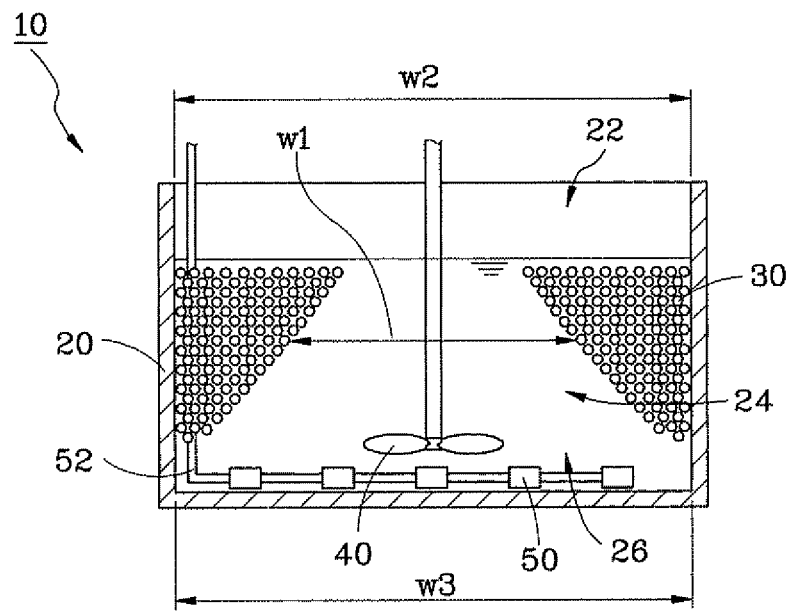
FIG. 3 is another schematic sectional side view of the wastewater treatment equipment in accordance with the first embodiment of the present invention (II).
Figure 4:
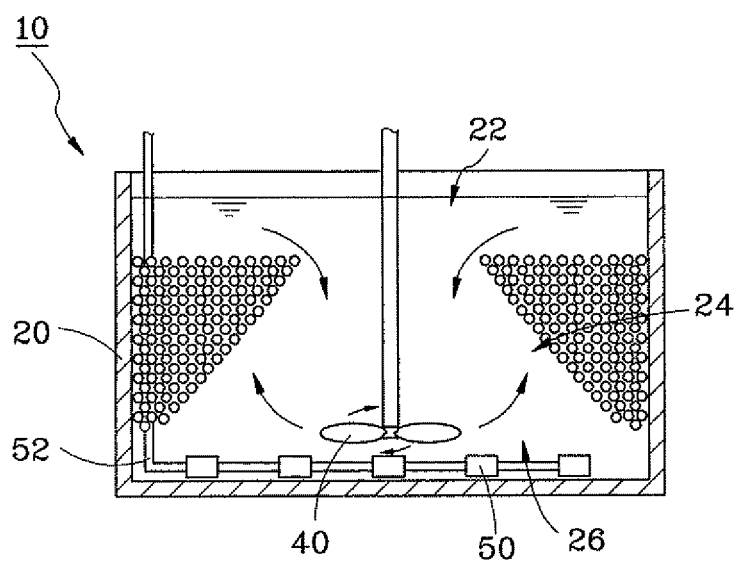
FIG. 4 is still another schematic sectional side view of the wastewater treatment equipment in accordance with the first embodiment of the present invention (III).

A wastewater treatment method in accordance with the present invention comprises the steps of:

a) providing multiple microorganism carriers 30, a stirrer 40 and a reaction tank 20 which defines therein an upper reaction area 22 that is disposed in a top side inside the reaction tank 20 and located above the microorganism carriers 30, a lower reaction area 26 that is disposed in a bottom side inside the reaction tank 20 and located beneath the microorganism carriers 30, and a passage area 24 that is disposed in communication between the upper reaction area 22 and the lower reaction area 26 and has a width W1 smaller than the width W2 of the upper reaction area 22 and the width W3 of the lower reaction area 26 and reducing gradually in direction toward the upper reaction area 22, the multiple microorganism carriers 30 arranged in the reaction tank 20 around the passage area 24, i.e. the passage area 24 is defined by the microorganism carriers 30, and along the inside wall of the reaction tank 20, the stirrer 40 arranged in lower reaction area 26 of the reaction tank 20, the passage area 24 and the lower reaction area 26 of the reaction tank 20 filled with water containing microorganisms including nitrifying bacteria and autotrophic denitrifying bacteria, the microorganism carriers 30 dipped in the water, as shown in FIG. 3;

b) guiding nitrogen-containing wastewater into the reaction tank 20 to have the upper reaction area 22 be filled up with the nitrogen-containing wastewater that contains $NH_4^+$, $NO_2^-$, $NO_3^-$ and organic substances, as shown in FIG. 1;

c) as shown in FIG. 4, operating the stirrer 40 to stir up the water in the reaction tank 20 and to cause the water to circulate repeatedly in proper order through the lower reaction area 26, gaps in between the microorganism carriers 30, the upper reaction area 22 and the passage area 24 so that microorganisms and pollutants in the water can be well mixed, and simultaneously using multiple disk aerators 50 to guide oxygen or air into the water in the reaction tank 20 for enabling $NH_4^+$ to be oxidized into $NO_2^-$ by means of a nitration reaction under the effect of nitrifying bacteria so that $NH_4^+$ that works as electron donor and $NO_2^-$ that works as electron acceptor can perform Anammox reaction in the upper reaction area 22, the passage area 24, the lower reaction area 26 and the surface of each of the microorganism carriers 30 under the effect of autotrophic denitrifying bacteria, causing the nitrogenous substances in the water in the reaction tank 20 to be converted into nitrogen gas;

d) stopping the stirrer 40 to let suspended solids settle down and the water in the reaction tank 20 gradually become clear;

e) exhausting the water of the upper reaction area 22 out of the reaction tank 20 (see FIG. 3); and f) repeating steps b), c), d) and e).

After exhaust of the water of the upper reaction area 22 of the reaction tank 20, microorganisms are still attached to the surface of the microorganism carriers 20 and suspending in the residual water in the reaction tank 20.

Figure 5:
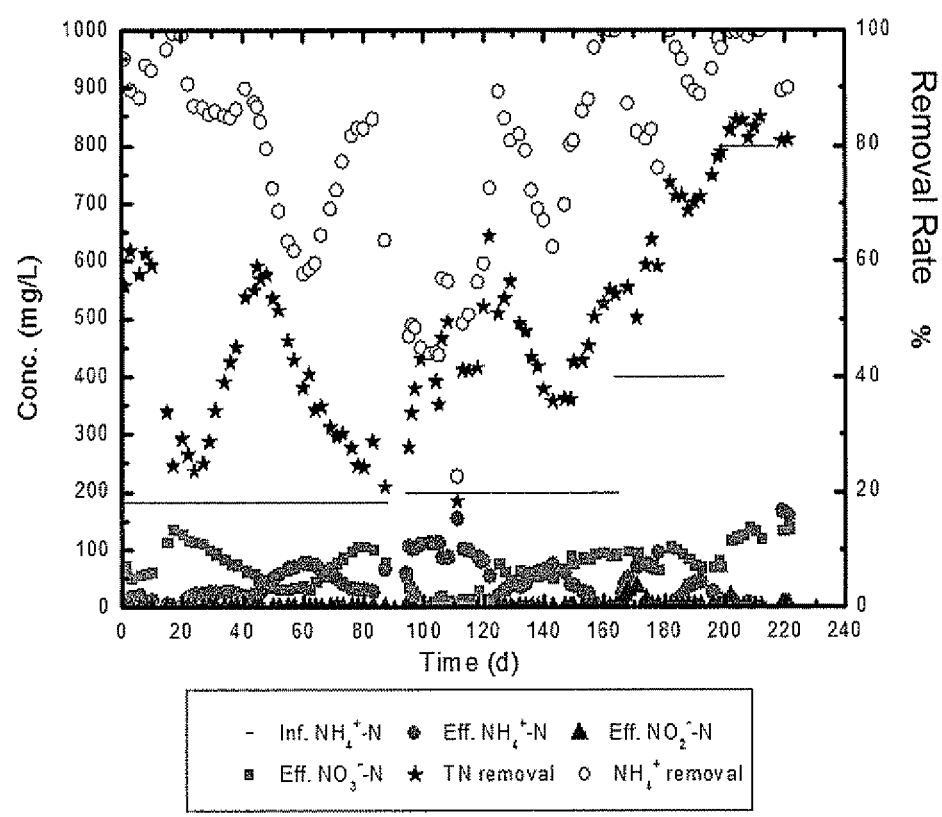
FIG. 5 is a removal efficiency diagram, illustrating the performance of the wastewater treatment equipment in accordance with the first embodiment of the present invention.

After step e), steps b), c), d) and e) are repeated again to purify the wastewater that contains nitrogen compounds. In one operation example of this wastewater treatment method, one complete cycle of steps b) through e) takes one day, step b) and step c) takes about 23 hours and more, and step d) takes about 20 minutes. FIG. 5 is a removal efficiency diagram, illustrating the performance of the wastewater treatment equipment in accordance with the present invention. In this example, the hydraulic retention time was 6 days, and the concentration of ammonia nitrogen in the intake flow of wastewater was adjusted from 180 to 800 mg-N/L. Under these conditions, the method are capable of approximately up to 80% total nitrogen removal.

Further, when microorganisms in the reaction tank 20 are well domesticated or the concentration of pollutants in the wastewater is low, the operator can lower the hydraulic retention time in the wastewater treatment equipment 10, for example, performing one complete cycle in 6 hours, i.e. four times per day, to increase the treatment capacity of the wastewater treatment equipment 10. In this case, steps b) and c) take about 5.5 hours and step d) takes about 20 minutes.

The width W1 of the passage area 24 reduces gradually in direction toward the upper reaction area 22, i.e., the equipment has a relatively greater number of microorganism carriers 30 arranged adjacent to the upper reaction area 22 and a relatively smaller number of microorganism carriers 30 arranged adjacent to the lower reaction area 26. The passage area 24 defined by the microorganism carriers 30 thus is conical and has a top opening and a lower opening wider than the top opening. This design enables more microorganism carriers 30 to be arranged in the reaction tank 20 and kept in fully contact with the flowing water, enhancing ammonia nitrogen removal efficiency.

In this embodiment, the microorganisms in the reaction tank 20 are mainly nitrifying bacteria and autotrophic denitrifying bacteria. In case the water in the reaction tank contains sufficient $NO_3^-$ and organic carbon sources, heterotrophic denitrifying bacteria will spontaneously grow under this environment, and will be attached with the aforesaid nitrifying bacteria and autotrophic denitrifying bacteria to the microorganism carriers 30 or suspending in the water in the reaction tank 20. Under the effect of these heterotrophic denitrifying bacteria, $NO_3^-$ can be also converted into nitrogen gas by a heterotrophic denitrification process which consumes organic substances. In addition to natural propagation, the user can also manually add heterotrophic denitrifying bacteria into the water in the reaction tank 20.

Figure 6:
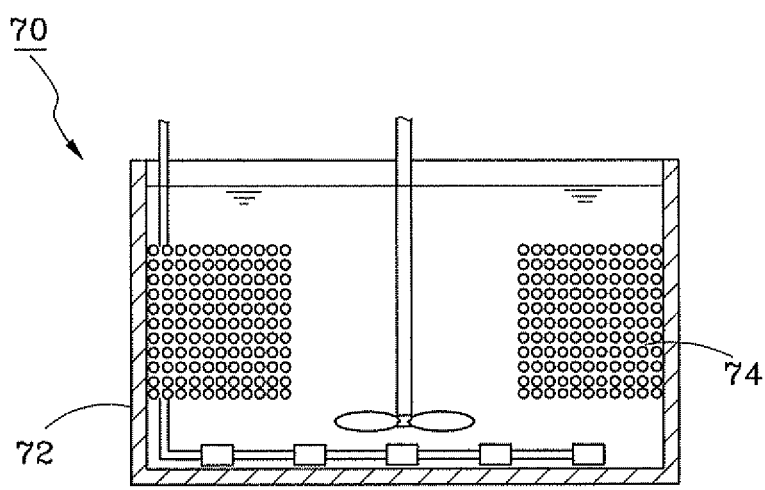
FIG. 6 is a schematic sectional side view of a wastewater treatment equipment in accordance with a second embodiment of the present invention

FIG. 6 illustrates a wastewater treatment equipment 70 in accordance with a second embodiment of the present invention. This second embodiment is substantially similar to the aforesaid first embodiment with the exception that the passage area 74 of the reaction tank 72 has a constant width. This second embodiment achieves the same effects as the aforesaid first embodiment.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A wastewater treatment method, comprising the steps of:
   a) providing a reaction tank, a plurality of microorganism carriers and a stirrer, said reaction tank defining therein an upper reaction area in a top side, a lower reaction area in a bottom side and a passage area in communication between said upper reaction area and said lower reaction area, said passage area having a width smaller than the width of said upper reaction area and the width of said lower reaction area, said microorganism carriers arranged in said reaction tank around said passage area and defining the passage area thereby, the width of the passage area reducing gradually in direction toward the upper reaction area, said stirrer arranged in said reaction tank, said passage area and said lower reaction area of said reaction tank filled with water containing microorganisms including nitrifying bacteria and autotrophic denitrifying bacteria, said microorganism carriers dipped in the water;
   b) guiding wastewater into said reaction tank to have said upper reaction area be filled up with the wastewater;
   c) operating said stirrer to stir up the water in said reaction tank and to cause the water to circulate in said reaction tank;
   d) stopping said stirrer to let suspended solids settle down in the water in said reaction tank; and
   e) exhausting the water of the upper reaction area out of said reaction tank.

2. The wastewater treatment method as claimed in claim 1, further comprising a sub-step of guiding oxygen into the water in said reaction tank during performance of step c).

3. The wastewater treatment method as claimed in claim 1, wherein said microorganism carriers are arranged along an inside wall of said reaction tank.

4. The wastewater treatment method as claimed in claim 1, wherein each said microorganism carrier comprises a plurality of grooves on the periphery thereof.

5. A wastewater treatment method, comprising the steps of:
   a) providing a reaction tank, a plurality of microorganism carriers and a stirrer, the microorganism carriers annularly arranged in the reaction tank and defining a conical passage area thereby, the passage area having a top opening and a lower opening wider than the top opening, the reaction tank defining therein an upper reaction area located above the microorganism carriers and a lower reaction area located beneath the microorganism carriers, both the upper reaction area and the lower reaction area being in communication with the passage area, the stirrer arranged in the reaction tank, the passage area and the lower reaction area filled with water containing microorganisms including nitrifying bacteria and autotrophic denitrifying bacteria, the microorganism carriers dipped in the water;
   b) guiding wastewater into the reaction tank to have the upper reaction area be filled up with the wastewater;
   c) operating the stirrer to stir up the water in the reaction tank and to cause the water to circulate in the reaction tank;
   d) stopping the stirrer to let suspended solids settle down in the water in the reaction tank; and
   e) exhausting the water of the upper reaction area out of the reaction tank.

6. The wastewater treatment method as claimed in claim 5, further comprising a sub-step of guiding oxygen into the water in the reaction tank during performance of step c).

7. The wastewater treatment method as claimed in claim 5, wherein the microorganism carriers are arranged along an inside wall of the reaction tank.

8. The wastewater treatment method as claimed in claim 5, wherein each of the microorganism carrier comprises a plurality of grooves on the periphery thereof.

9. The wastewater treatment method as claimed in claim 5, wherein the stirrer is arranged in the lower reaction area of the reaction tank.

* * * * *